United States Patent [19]
Elsing et al.

[11] Patent Number: 5,859,745
[45] Date of Patent: Jan. 12, 1999

[54] SPLIT RING MOUNTING FOR DISK DRIVE SPINDLE AND ACTUATOR SHAFTS

[75] Inventors: John W. Elsing, Edina; Kent J. Forbord, St. Louis Park; Blaine T. Peterson, Bloomington, all of Minn.

[73] Assignee: Seagate Technology, Inc., Scotts Valley, Calif.

[21] Appl. No.: 146,311

[22] Filed: Nov. 2, 1993

[51] Int. Cl.$^6$ .................................................. G11B 17/02
[52] U.S. Cl. .................................... 360/97.01; 360/98.07; 360/99.08
[58] Field of Search .............................. 360/97.01, 97.02, 360/97.03, 98.01, 98.07, 99.08, 106

[56] References Cited

U.S. PATENT DOCUMENTS

| | | | |
|---|---|---|---|
| 4,672,487 | 6/1987 | Brand et al. | 360/98.07 |
| 4,677,509 | 6/1987 | Nishida et al. | 360/98.07 |
| 4,797,762 | 1/1989 | Levy et al. | 360/98.07 |
| 4,814,652 | 3/1989 | Wright | 360/98.07 |
| 4,858,044 | 8/1989 | Crapo | 360/99.08 |
| 4,894,738 | 1/1990 | Elsasser et al. | 360/97.01 |
| 4,905,110 | 2/1990 | Krum et al. | 360/99.08 |
| 4,965,686 | 10/1990 | Young et al. | 360/98.07 |
| 4,985,792 | 1/1991 | Moir | 360/98.07 |
| 4,996,613 | 2/1991 | Hishida | 360/99.08 |
| 5,031,061 | 7/1991 | Hatch | 360/98.07 |
| 5,089,922 | 2/1992 | Le Clair | 360/99.08 |
| 5,091,809 | 2/1992 | Connors et al. | 360/99.08 |
| 5,212,607 | 5/1993 | Elsing et al. | 360/99.08 |
| 5,231,557 | 7/1993 | Ogawa et al. | 360/106 |
| 5,260,847 | 11/1993 | Basehore et al. | 360/106 |
| 5,305,163 | 4/1994 | Holm | 360/98.07 |

*Primary Examiner*—Robert S. Tupper
*Attorney, Agent, or Firm*—Frederick W. Niebuhr

[57] ABSTRACT

In a magnetic disk drive, a stationary spindle shaft and a rotary actuator shaft are mounted to opposed walls of the drive housing in precise radial and axial alignment with one of the walls, despite relatively relaxed tolerances in the mounting components. At each shaft end, an axially directed fastener is surrounded by an alignment ring with two frusto-conical guide surfaces, one engaged with an enlarged head of the fastener and the other engaged with the associated shaft end. An axially inward tightening of the fastener brings the enlarged head and shaft end into engagement with their respective guide surfaces of the alignment ring. The fastener is tightened further to elastically elongate the fastener and create a tensile force which, through wedging action, urges the alignment ring radially outward into a firm frictional engagement with a rim of the selected wall, thus to radially align and integrally mount the shaft end with respect to the wall. One of the alignment rings for each shaft has an inclined radially outward edge which, in combination with a seal member that provides a reference surface, axially aligns the shaft relative to the selected wall. The opposite alignment ring has an axial radially outward wall, to accommodate a variance in the axial distance between the opposed housing walls.

34 Claims, 4 Drawing Sheets

SPLIT RING MOUNTING FOR DISK DRIVE SPINDLE AND ACTUATOR SHAFTS

BACKGROUND OF THE INVENTION

This invention relates to devices for reading, writing and storing bit-encoded data, and more particularly to disk drives including packs of multiple, concentrically stacked disks mounted to rotate on stationary spindle shafts.

The ongoing effort to increase data storage capabilities of magnetic disk drives and other data storage devices is concerned largely with increasing the density at which data can be stored on the available recording surface area. Another approach involves mounting multiple disks integrally, concentrically and axially spaced apart from one another as part of a single spindle assembly. Such assemblies typically include an elongate spindle shaft, a hub that directly supports the disks, and bearing assemblies at opposite ends of the spindle shaft to support the hub and disks for rotation relative to the disk drive housing. Further, an actuator is mounted movably relative to the housing for supporting several data transducing heads. The actuator (usually a rotary actuator) moves the transducing heads to selectively position them relative to the disks.

The spindle shaft can be mounted to rotate relative to the housing through bearings. Alternatively, the spindle shaft can be stationary or fixed within the housing, with the hub and disks mounted to rotate on the shaft. This latter approach allows a more secure, fixed mounting of the shaft to reduce vibration, mass and inertia of rotating parts. Thus, a stationary spindle shaft facilitates use of higher data storage densities, by enabling a more precise alignment of the disk pack and rotary actuator, and by enhancing stability during spindle rotation.

In the highly competitive disk drive market, however, further considerations must be addressed. The disk drive housing must be strong, light weight, resistant to vibration, and provide an effective seal to prevent contamination of the housing interior, particularly near the disks. Cost considerations stimulate efforts to employ less expensive materials and reduce the number of parts and steps involved in assembling the disk drive. Disk drives are frequently subject to size constraints. For example, the three and one-half inch magnetic disk drive is subject to an industry standard governing maximum dimensions for length, width and height of five and three-fourths, four, and one and five-eighths inches, respectively. A further consideration, particularly when different materials are interconnected or contiguous, is the need to minimize changes in component alignment due to differences in coefficients of thermal expansion.

Considerations of alignment, cost and maximum height play a role in determining how the spindle shaft and rotary actuator shaft can be mounted within the disk drive housing. Tapped flange mounting, for example, requires substantial axial length to install a tapped flange to receive the spindle. This reduces the height available to accommodate an additional disk or a motor with enhanced length, higher efficiency windings. Press fit shaft mounting is costly, and difficult to assemble or rework. Mounting shafts using V-blocks or similar clamps requires axial space. Finally, direct butt joint mounting does not offer the precise alignment required for certain applications.

The recording surfaces of 3½ inch drives include as many as 3,000 tracks per inch, for a spacing of about 0.0003 inches between adjacent tracks. Accordingly, slight deviations from tolerances and thermal mismatch can have a major impact on track seeking and track following accuracy during temperature changes.

Therefore, it is an object of the present invention to provide a means for precisely and rigidly mounting a spindle shaft, rotary actuator shaft or both within a disk drive housing, without unduly strict tolerances for the shaft or its mounting components.

Another object is to provide a means for mounting an elongate spindle or rotary actuator shaft between two opposed walls of a disk drive housing, using minimal axial space or height.

Yet another object is to provide a disk drive with low cost yet reliable approach to positioning and orienting a spindle shaft and a rotary actuator shaft, with respect to a common datum and therefore with respect to one another.

Still another object is to provide a mounting means which is extremely rigid and able to withstand high shock and vibration without any detectable movement at shaft/housing interfaces.

SUMMARY OF THE INVENTION

To achieve these and other objects, there is provided a disk drive housing having first and second opposed housing walls, and an elongate spindle shaft having first and second opposite shaft ends. The spindle shaft supports at least one data storage disk for rotation relative to the spindle about a spindle axis. A substantially rigid but elastically deformable fastener has an elongate shank inserted axially into the spindle shaft via the first shaft end. The fastener also has a head larger in diameter than the shank. A substantially rigid but elastically deformable alignment means surrounds the fastener. The alignment means has several surfaces including a frusto-conical first guide surface, a frusto-conical second guide surface and a radially outward mounting edge. The first guide surface is engaged with the head portion, while the second guide surface is engaged with the first shaft end. The mounting edge is surrounded by a rim of the first wall. The fastener is inserted to a predetermined axial location beyond a point at which the first and second guide surfaces engage the first head and shaft first end, respectively. This causes a residual axial tensile force in the fastener while urging the mounting edge into a firm frictional engagement with the rim, thereby radially aligning and integrally securing the first shaft end with respect to the first wall. A means is provided for mounting the second shaft end integrally with respect to the second wall, whereby the spindle shaft spans the distance between the first and second walls and supports the disk for rotation inside the housing.

The preferred alignment means comprises an alignment ring in which the guide surfaces and the mounting edge are concentric on the spindle axis. The alignment ring is not continuous, but rather includes an angular gap defined by two confronting, angularly spaced-apart edges. The gap is small compared to the circumference of the alignment ring, for example less than ten percent of the circumference, so that the ring is substantially continuous. However, the gap substantially enhances the capacity of the alignment ring to elongate and expand or contract circumferentially, and to radially flex in response to forces from surrounding components.

Advantageously the first and second guide surfaces are inclined relative to the spindle axis, each at an angle less than about 45 degrees. More preferably, both guide surfaces are inclined at about a 41 degree angle, for a mechanical advantage to the axially directed fastener, although requiring slightly greater fastener displacement to achieve a given radial displacement.

A suitable fastener is an elongate flathead screw with an externally threaded shank and a frusto-conical head that matches the incline of the first guide surface. The spindle shaft has an internally threaded opening at the first shaft end to accommodate the shank. The portion of the first shaft end that engages the second guide surface also preferably is frusto-conical and matched to the incline of the second guide surface. This maximizes the area of surface contact of the contiguous surfaces within the size constraints, to minimize the potential for denting or other damage and promote sliding of contiguous surfaces relative to one another. Components tend to rapidly seek their optimal alignment positions during assembly.

Because the alignment ring substantially surrounds the fastener, radial forces between the fastener and ring, and between the ring and shaft, are symmetrical about the ring circumference. Further, because the first and second guide surfaces are inclined at the same angle, any axial displacement or vertical force tends to exert the same radial displacement or force in each guide surface. Consequently, the axial force from fastener tension is balanced, i.e. equal in opposite directions on opposite sides of the alignment ring with the opposing forces from tension continually tending to center the fastener and shaft at a mid-point or junction of the two guide surfaces.

The preferred ring is constructed of aluminum, and the preferred material for the fastener and shaft is steel. Regardless of the circumferential expansion and contraction of the alignment ring, radial forces remain essentially balanced due to the minute size of the gap compared to the ring circumference.

The alignment ring can be shaped to promote axial spindle shaft alignment as well. More particularly, the radially outward edge can be frusto-conical, converging in the axially inward direction. Then, a seal is integrally mounted to the spindle shaft, axially inwardly of the first wall. The seal has a reference surface confronting the wall. As the fastener is threaded into the spindle shaft, the alignment ring draws the first wall axially inward relative to the shaft until it engages the reference surface, thus positively axially aligning the shaft with the first wall.

With the first shaft end both axially and radially aligned relative to the first wall, the second or opposite shaft end can be mounted to the second wall in a manner that requires only a radial alignment, to accommodate variances in the axial distance between the two walls. This is achieved with a second elongate threaded fastener and a second alignment ring in combination with the second shaft end in much the same manner as their counterparts at the first shaft end. One critical difference is the radially outward edge of the second alignment ring, which is directed axially so as to be cylindrical rather than frusto-conical. The adjoining rim of the second wall likewise is cylindrical. As a result, the second alignment ring exerts only a radial force upon the second wall as it expands, and therefore does not axially displace the wall. Moreover, the axial positioning of the second alignment ring relative to the second wall can be varied without causing or requiring radial displacement of either component. Thus, the first and second alignment rings satisfactorily secure the spindle shaft over a range of axial distances between the opposed housing walls.

Further in accordance with the present invention, a second pair of alignment rings can be used to similarly mount and align a shaft supporting a rotary actuator. Both shafts are mounted with reference to the first wall and thus are aligned axially as well as radially with one another. As a result, each transducing head, as it traverses an arcuate path over the recording surface of its associated disk, can be more positively controlled.

Thus, in accordance with the present invention, spindle shafts and rotary actuator shafts can be mounted in precisely determined positions and orientations relative to disk drive housings despite relatively lenient tolerances in component parts of the shaft mounting structure. The wedging actio of the alignment rings effectively locks the shaft ends, preventing any slippage or other movement between the shaft ends and the deck during shock events or temperature excursions which otherwise may cause off-track errors. Also, the shaft mounting configuration occupies minimal axial space, preserving valuable height for an additional data storage disk or a spindle motor having higher efficiency due to the increased length of its stator windings.

IN THE DRAWINGS

For a further understanding of the above and other features and advantages, reference is made to the following detailed description and to the drawings in which.

DETAILED DESCRIPTION OF THE PREFERRED EMBODIMENTS

Figure 1:
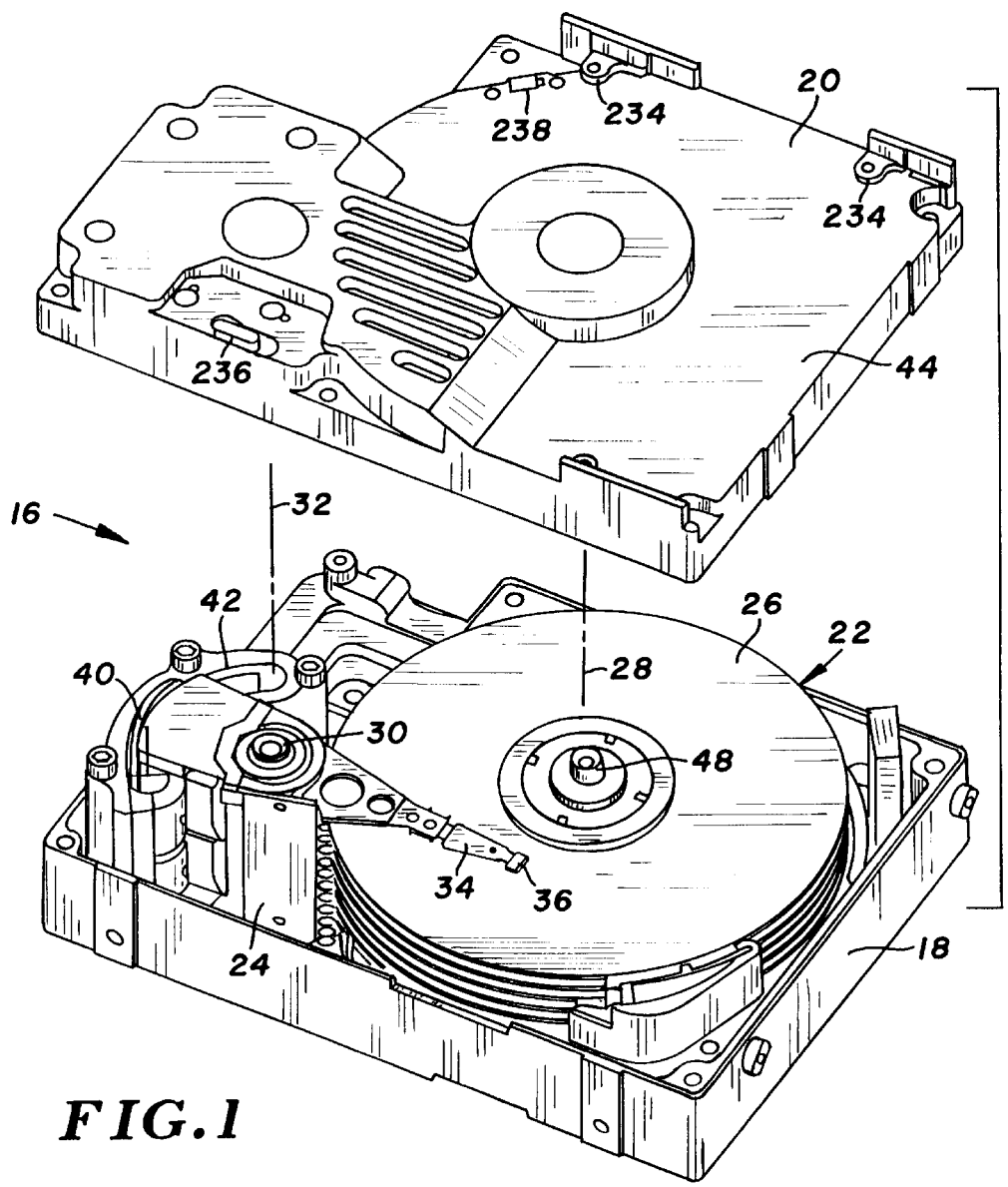
FIG. 1 is a perspective view of a magnetic disk drive constructed in accordance with the present invention, with a top cover of the drive housing removed to illustrate certain features.

Turning now to the drawings, there is shown in FIG. 1 a magnetic disk drive 16. The disk drive has a rigid outer housing including a bottom deck 18 and a top deck 20. In this figure, top deck 20 is removed from bottom deck 18 to reveal a disk pack or hub assembly 22 and a rotary actuator 24, both of which are mounted movably with respect to the housing. More particularly, the spindle assembly, including a top disk 26 and several additional concentrically stacked and spaced-apart disks, is rotatable about a vertical spindle axis 28.

Rotary actuator 24 includes an actuator shaft 30 mounted to pivot relative to the deck about a vertical actuator axis 32.

Figure 2:
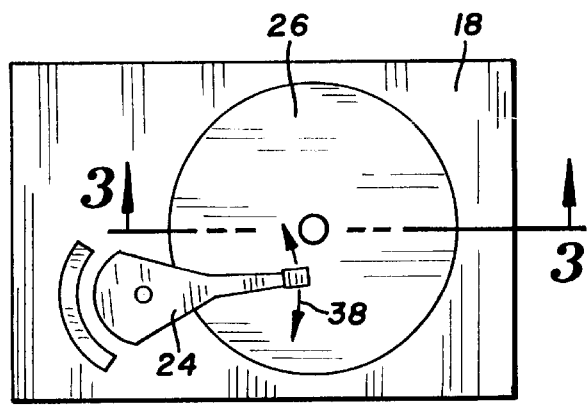
FIG. 2 is a top view of parts of the drive beneath the cover.

Several transducer support arms, including a top support arm 34, are fixed with respect to the actuator shaft and rotate with the shaft. Each arm carries at least one magnetic data transducing head, e.g. transducing head 36 on support arm 34. As best seen in FIG. 2, rotary actuator 24 is pivoted to move the transducing heads along arcuate paths generally radially of the disks as indicated at 38. Selective actuator pivoting, in combination with controlled rotation of the disks about spindle axis 28, allows reading and recording of data at any desired location on any one of the disk recording surfaces. Actuator 24 is pivoted by selective application of electrical current to a coil 40 supported for arcuate movement within a magnetic field created by a permanent magnet arrangement 42 including several magnets and a pole piece (not illustrated in further detail).

Figure 3:
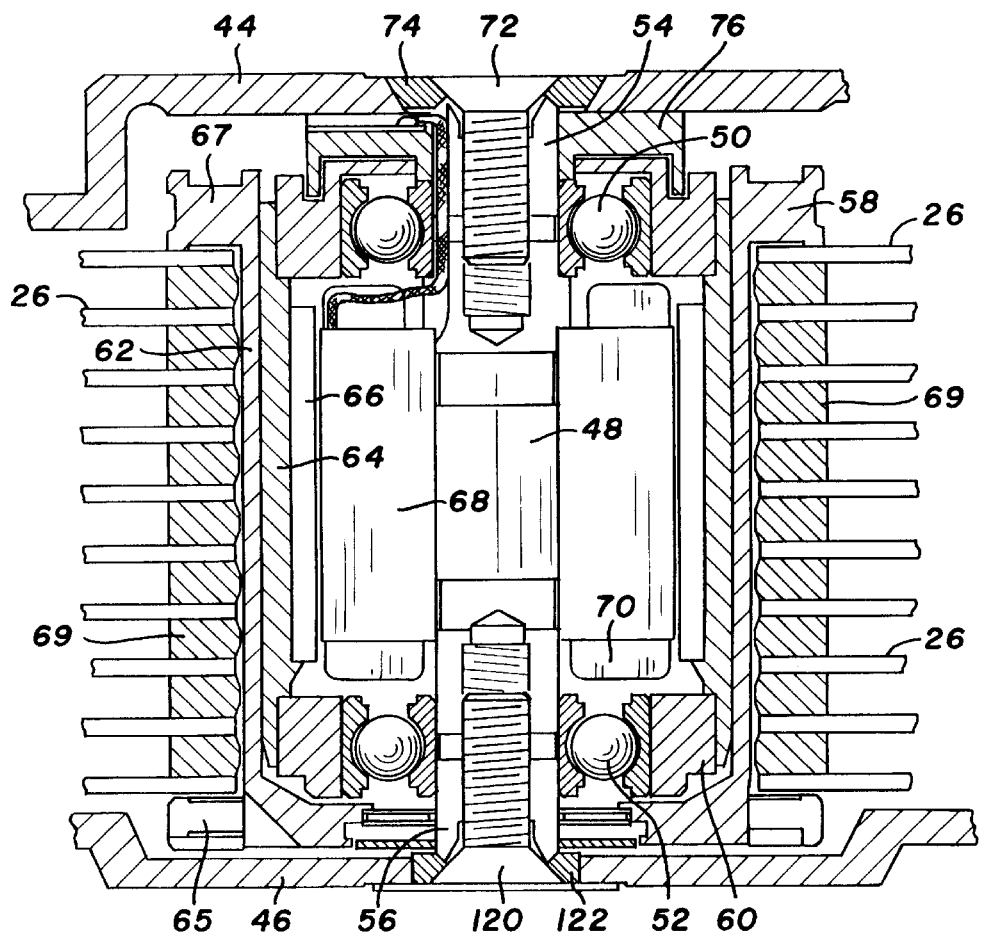
FIG. 3 is a sectional view taken along the line 3—3 in FIG. 2.

Actuator axis 32 and a spindle axis 28 are supported between two opposed housing walls, in particular a top wall 44 of top deck 20 and a bottom wall 46 of bottom deck 18. The spindle shaft and actuator shaft are stationary, i.e. integral with the housing, with the disks and support arms being mounted to rotate relative to their respective shafts. FIG. 3 illustrates the rotational mounting of disk pack 22 and the fixed mounting of a spindle shaft 48.

Considering first the rotational mounting, upper and lower bearings 50 and 52 have respective annular inner races fixed to spindle shaft 48 along upper and lower end regions 54 and 56 of the shaft. The bearing outer races are fixed to respective annular bearing casings, including an upper casing 58 and a lower casing 60. The bearing casings in turn are fixed with respect to a generally cup-shaped hub 62. An annular back iron 64 is mounted to an annular wall of the hub with an annular magnet arrangement 66 secured to the back iron. The magnet arrangement includes several magnets.

A stator, including an annular arrangement of core laminations 68 and windings 70 is fixed to stationary spindle shaft 48. A narrow annular gap is provided between the stator and the rotor (which includes the back iron and magnets). In a known manner, an electrical current is supplied to stator windings 70 to generate a magnetic field about the stator. The magnetic field interacts with the magnetic fields of the magnet arrangement to provide the tangential force to rotate disk pack 22 relative to spindle shaft 48. Hub 62 preferably is constructed of aluminum, as are the deck and cover.

A clamping ring 65, a lip 67 of hub 62, and several annular spacer rings 69 maintain disks 26 in axially spaced apart relation and fixed to the hub.

Figure 4:
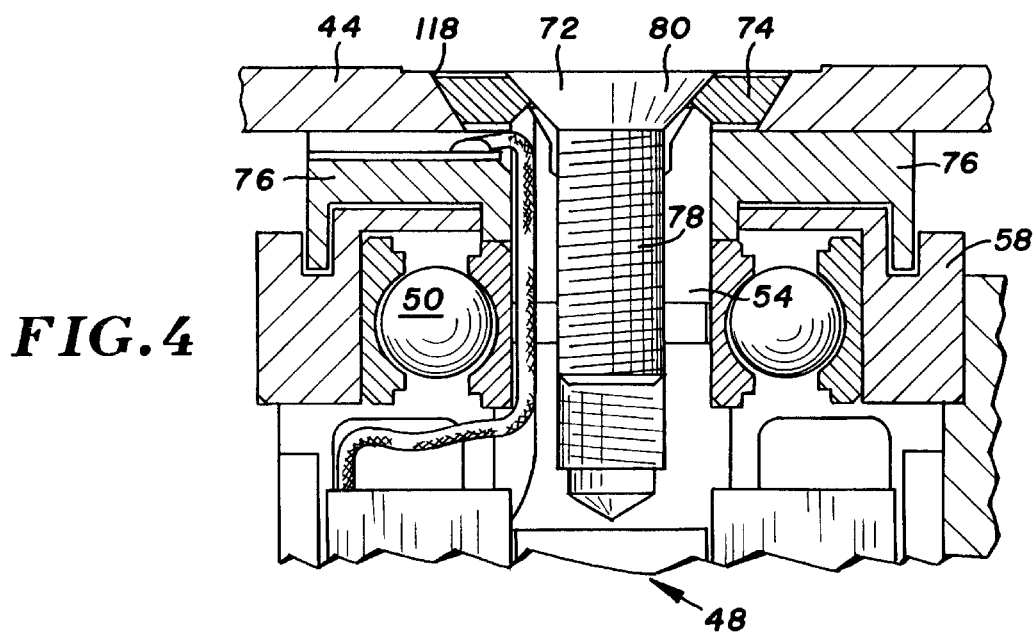
FIG. 4 is an enlarged partial view of FIG. 3.
Figure 5:
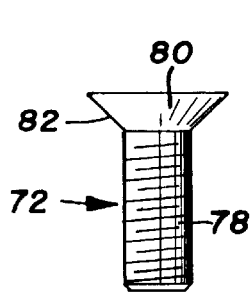
FIG. 5 is a side elevation of a fastener employed in mounting the shaft.

The fixed mounting of the spindle shaft, more particularly at upper shaft end region 54, is shown in FIG. 4. The upper end of spindle shaft 48 is secured with respect to top wall 44 of the cover by an elongate upper fastener 72, an upper alignment ring 74, and an annular mounting flange 76 press-fit to the shaft along upper end region 54. As best seen in FIG. 5, upper fastener 72 is a flat head screw including an externally threaded shank 78 and a frusto-conical head 80 at the top of the shank. An interfacing edge surface 82 of the head is inclined at an angle of 41 degrees from the central axis of the fastener, which coincides with spindle axis 28 when fastener 72 is threaded into the spindle shaft.

Figure 6:
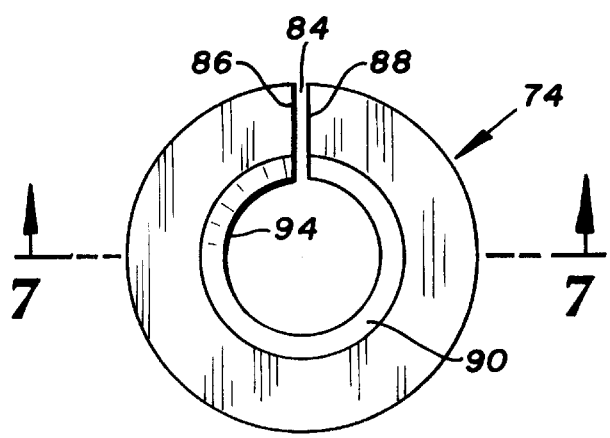
FIG. 6 is a top plan view of an upper alignment ring used in mounting a spindle in the disk drive.
Figure 7:
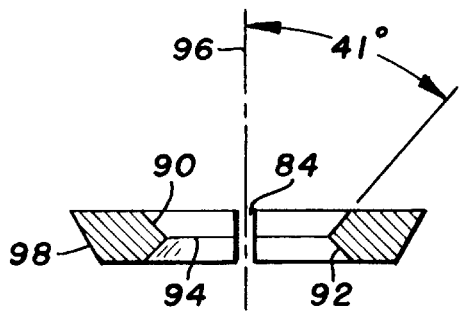
FIG. 7 is a sectional view taken along the line 7—7 in FIG. 6.

FIGS. 6 and 7 show alignment ring 74 in greater detail. The alignment ring is uniform in section over its circumference, except for a narrow gap 84 defined by a pair of angularly spaced apart confronting edges 86 and 88. Gap 84 permits alignment ring 74 to respond to external forces due to fastener 72 (particularly head 80), spindle shaft 48, and top wall 44 of the top deck. Such external forces can induce circumferential elongation which tends to increase gap 84. Thus, in the context of the minute dimensions involved, alignment ring 74 can undergo substantial and pronounced adjustments to compensate for variations in component dimensions.

Alignment ring 74 employs wedging action to radially and axially align spindle shaft 48 relative to top wall 44. For radial alignment, the ring includes two radially inward guide surfaces 90 and 92, joined to one another along an edge or slight radius 94. The guide surfaces are frusto-conical, with upper guide surface 90 converging in an axially inward direction (downward as viewed in the figure), while guide surface 92 diverges in the axially inward direction. Each of guide surfaces 90 and 92 is inclined from a central ring axis 96 by an angle of 41 degrees. When ring 74 supports spindle shaft 48, ring axis 96 coincides with spindle axis 28. Alignment ring 74 also includes a frusto-conical radially outward mounting edge 98, which diverges from the ring axis at an angle of 30 degrees. The alignment ring preferably is constructed of aluminum.

Figure 8:
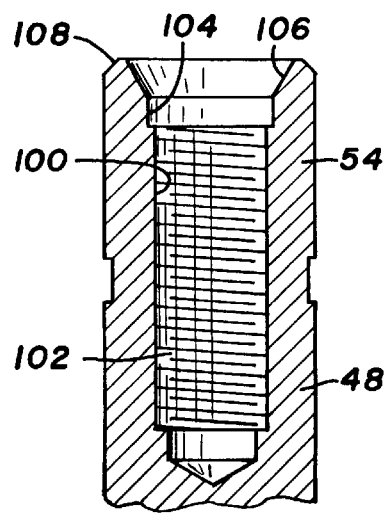
FIG. 8 is a sectional view of an upper end region of the shaft.

In FIG. 8, upper end region 54 of shaft 48 is shown in section to reveal an opening 100 for receipt of and threaded engagement width shank 78 of fastener 72. Opening 100 includes an elongate internally threaded segment 102, a radially enlarged segment 104, and an upwardly diverging segment 106. Radially outwardly of the tapered segment, the upper end of spindle shaft 48 is selectively shaped to provide a frusto-conical interface surface 108 inclined at an angle of 41 degrees relative to the spindle axis.

Lower end section 56 of the spindle shaft, not shown separately, has a corresponding lower opening and lower interface surface, substantially identical to their counterparts at the upper end of the spindle.

Figure 9:
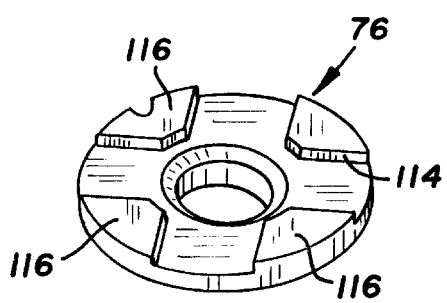
FIG. 9 is a perspective view of a mounting flange employed in axially aligning the shaft.
Figure 10:
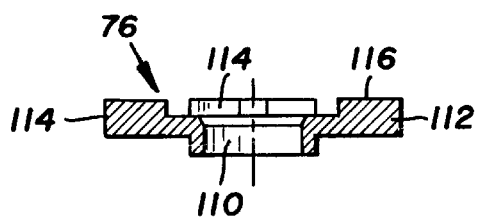
FIG. 10 is a sectional view of the seal member.

As seen in FIGS. 9 and 10, mounting flange 76 includes a central collar 110 selectively sized for press-fit mounting to the spindle shaft, a planar section 112 extended radially away from the collar, and four mounting pads 114 extended axially upwardly from the planar section. Each pad has a planar top surface 116, with the top surfaces in combination providing a reference surface for axially positioning spindle shaft 48 with respect to top wall 44. The recesses between pads 114 receive and contain flexible circuitry (not shown) for providing electrical current to the spindle motor windings.

Returning to FIG. 4, it is seen that fastener 72, spindle shaft 48 and alignment ring 74 cooperate to provide a wedging action that maintains the radial position of the spindle with respect to top wall 44. More particularly, interface surface 82 of the fastener is contiguous with guide surface 90 of the ring, while interface surface 108 engages guide surface 92. Shank 78 is threadedly engaged within opening 100. However, head 80 is spaced apart from the top end of the spindle shaft, engaging only the upper guide surface 90. Fastener 72 is turned to insert shank 78 downward beyond the point of engagement of the guide surfaces and interface surfaces. This elastically elongates fastener 72 in the axial direction, particularly along that portion of shank 78 aligned with enlarged segment 104 and thus not threadedly engaged with the spindle shaft. Elongation introduces tension into the fastener, urging head 80 downwardly against guide surface 90 of the alignment ring. The tension in fastener 72 also provides a counterbalancing axial force, acting through spindle shaft 48 against lower guide surface 92.

By contrast, and because of the incline of guide surfaces 90 and 92, tension in fastener 72 provides a radial force that urges the alignment ring radially away from spindle axis 28. Because of the ring's uniformity and continuity (except for gap 84), the radial forces are substantially uniform, and act to urge radially outward edge 98 against an inclined rim 118 of the top wall. Thus, regardless of the magnitude of these radial forces, they tend to radially center spindle shaft 48 and fastener 72 with respect to the top wall, and more particularly within rim 118.

As previously noted, guide surfaces 90 and 92 while diverging in opposite directions, are inclined at the same angle relative to the spindle axis. Thus, each guide surface resolves a given tensile force into a radial component of the same magnitude. The 41 degree angle of incline is selected to provide a mechanical advantage to fastener 72, without requiring undue axial fastener displacement for a given radial displacement of the alignment ring. Any incline of less than 45 degrees provides at least a slight mechanical advantage to the fastener. Too slight an angle (e.g. 20 degrees from the spindle axis) would result in an undesirably high level of axial fastener displacement for a given radial ring displacement. The 41 degree incline has been found to be a satisfactory compromise. It is to be appreciated that different dimensions and/or different materials for the spindle mounting components might yield a different optimum angle.

As fastener 72 is tightened into the spindle shaft, it becomes elastically elongated and provides a tensile force that is resolved in wedge-like fashion to radially drive alignment ring 74 into a firm, frictional engagement with rim 118. Accordingly, upper end region 54 of the spindle shaft becomes radially aligned and integral with respect to the top wall. Due to the wedging action, the positive connection and centered alignment are achieved without unduly strict tolerances for the spindle shaft diameter, inner and outer alignment ring diameters and diameter of rim 118. For example, given a rim diameter at the upper end of its permitted range, the desired frictional engagement with edge 98 simply requires further radial expansion of alignment ring 74. A further insertion of fastener 72 readily achieves the desired ring expansion, due to gap 84. Likewise, deviations in the remaining diameters can be compensated by adjusting the degree of fastener insertion. As a result, a positive, rigid and radially centered mounting is achieved based on tolerances substantially less stringent than for a comparable press-fit spindle shaft mounting.

The wedging action further tends to maintain the desired spindle shaft position over a wide temperature range, in spite of the thermal mismatch of the spindle, fasteners and seal member (constructed of steel) with the deck, cover and alignment rings (aluminum).

Inclined, radially outward edge 98 also axially aligns the spindle shaft. As fastener 72 is tightened, spindle shaft 48 and seal member 76 are drawn upwardly toward top wall 44 until pad top surfaces 116 (i.e. the reference surface) engage the top wall. The 30 degree incline of edge 98 and rim 118 provide a substantial mechanical advantage to fastener 72 for pulling spindle shaft 48 upward to position the reference surface tightly against cover top wall 44, thus to establish the top wall as a datum to which other critical component locations may be referenced.

Preferably, the reference surface and interface surface 108 are selectively axially located relative to one another such that within the permitted component tolerances, the reference surface engages top wall 44 simultaneously with or slightly after the engagement of surface 108 with guide surface 92.

Figure 11:
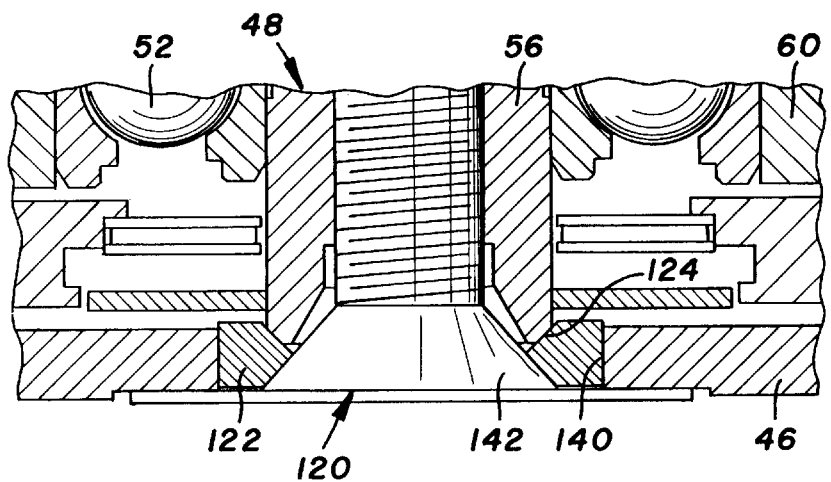
FIG. 11 is an enlarged partial view of FIG. 3.

As seen in FIG. 11, lower end region 56 of spindle shaft 48 is mounted with respect to bottom wall 46 in much the same manner, employing a lower fastener 120, a lower alignment ring 122 and a selectively inclined interface surface 124 of the spindle shaft. Lower fastener 120 is substantially identical in construction to upper fastener 72 and a lower opening in the spindle shaft is likewise substantially identical to opening 100.

Figure 12:
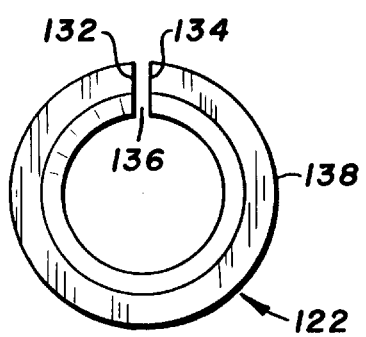
FIG. 12 is a top plan view of a lower alignment ring used in mounting the spindle.
Figure 13:
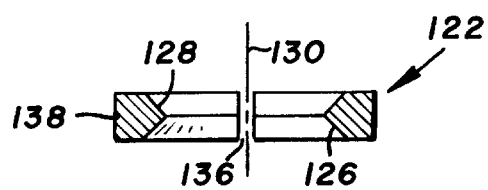
FIG. 13 is a sectional view taken along the line 13—13 in FIG. 12.

As seen in FIGS. 11 and 12, lower alignment ring 122 is similar in construction to upper alignment ring 74, but not identical. The sealing ring has two frusto-conical radially inward guide surfaces 126 and 128, each inclined at an angle of 41 degrees relative to a central axis 130 of the ring. Guide surfaces 126 and 128 respectively converge and diverge in the axially inward direction, which for alignment ring 122 is the upward direction as viewed in FIGS. 3 and 11. Angularly spaced apart edges 132 and 134 define a narrow angular gap 136. In these respects, the lower alignment ring is substantially identical to the upper alignment ring.

A critical difference lies in the orientation of a radially outward mounting edge 138 of the lower alignment ring. Edge 138 is not inclined, but rather is parallel to axis 130. Similarly, a rim 140 of bottom wall 46 that surrounds alignment ring 122 is parallel to the ring axis, which of course coincides with the spindle axis when ring 122 is mounted as shown in FIG. 11. There is no lower seal member and thus no reference surface urged axially against bottom wall 46. Rather, the axial alignment of spindle shaft 48 relative to bottom wall 46 is maintained solely by the frictional engagement of edge 138 and rim 140. Thus, radially outward edge 138 can interface with rim 140 along a range of axial positions, to accommodate a range of axial distances between top wall 44 and bottom wall 46.

Lower shaft end region 56 is radially centered within rim 140 in much the same manner as the upper spindle end is radially aligned. Fastener 120 is turned upwardly into the spindle shaft beyond the point at which interfacing surfaces of the head 142 and spindle shaft engage their respective guide surfaces 126 and 128. The resulting tension in fastener 120 urges alignment ring 122 radially outwardly to establish the required integral mounting and radial centering.

While only the mounting of spindle shaft 48 is shown in detail, it is to be understood that actuator shaft 30 is mounted in a substantially identical manner with counterpart components at the upper end of the shaft including an alignment ring, fastener and seal member or other appropriate reference surface; and a lower fastener and sealing ring. By axially positioning the spindle shaft and actuator shaft with reference to the same wall (i.e. top wall 44), their axial position relative to one another is more accurately established.

Figure 15:
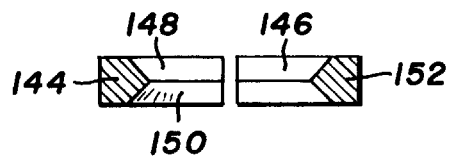
FIGS. 14 and 15 illustrate an alternative embodiment in the form of alignment segments.
Figure 14:
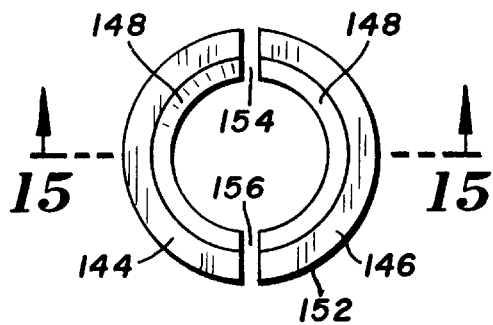
Figure 16:
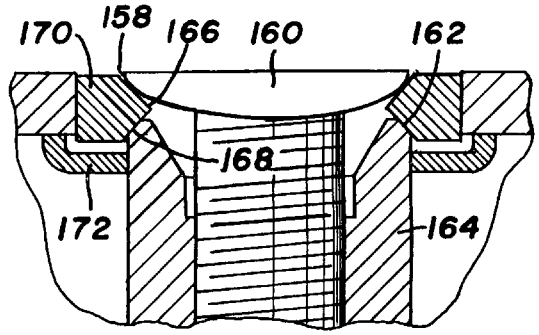
FIG. 16 illustrates a further alternative embodiment in the form of rounded interface surfaces.

FIGS. 14–16 illustrate alternative, less preferred embodiments of the present invention. More particularly, FIGS. 14 and 15 illustrate two substantially semicircular segments 144 and 146, usable in combination and in lieu of lower alignment ring 122. Together, segments 144 and 146 provide radially inward guide surfaces 148 and 150, and a radially outward axially aligned edge 152. A similar pair of semicircular segments can be used in lieu of upper alignment ring 74, with the remaining mounting components being substantially identical.

The segmented structure provides two gaps, as indicated at 154 and 156 in FIG. 14, thus enhancing the degree of available circumferential expansion. However, this advantage is achieved only at the cost of increased difficulty in assembling the components.

FIG. 16 illustrates a further alternative configuration in which an interfacing surface 158 of a fastener 160 and an interfacing surface 162 of a rotary actuator shaft 164 are formed with a radius, rather than planar. Corresponding guide surfaces 166 and 168 of an upper alignment ring 170 are planar and inclined at 41 degree angles relative to the spindle shaft axis, as before. An alignment member 172 axially aligns shaft 164. This approach affords the advantage of avoiding the need for parallelism of each interfacing surface and its associated guide surface. However, it also substantially reduces the area over which each interfacing surface and associated guide surface are contiguous. Unless the shaft, fastener and alignment ring are constructed of a sufficiently hard material, there is a risk of the rounded interface surfaces forming indentations in the planar guide surfaces, which would diminish the capacity of the components to respond to temperature fluctuations.

Thus in accordance with the present invention, spindle shafts and rotary actuator shafts can be precisely aligned radially and axially with respect to a disk drive housing, despite relatively relaxed tolerances for the mounting components. The shafts are locked in a manner which prevents their movement during an external shock event which may occur during shipping or handling. The shafts are also locked in a manner which prevents any slippage or relative movement due to thermally induced stresses to ensure satisfactory operation of the drive over widely varying temperatures. Finally, a high degree of radial and axial accuracy is achieved, with mounting components that require minimal axial space. This preserves valuable height for accommodating a taller disk pack or a taller, more efficient spindle motor. This high degree of radial and axial accuracy facilitates precise axial alignment between the head arms of the actuator and the disks mounted on the spindle, which allows for closer disk spacing and ultimately more disks in one drive.

What is claimed is:

1. A data storage apparatus, including:

a disk drive housing having first and second opposed housing walls, and an elongate spindle shaft having first and second opposite shaft ends and supporting at least one data storage disk for rotation relative to the spindle about a spindle axis;

a substantially rigid but elastically deformable fastener inserted axially into the spindle shaft via the first shaft end, and having an enlarged head;

a substantially rigid but elastically deformable alignment means surrounding the fastener and having: a frusto-conical first inner guide surface converging in an axially inward direction toward the spindle shaft and engaged with the enlarged head ; a frusto-conical second inner guide surface diverging in the axially inward direction and engaged with the first shaft end; and a radially outward edge surrounded by a rim of the first wall;

wherein the fastener is so inserted to a predetermined axial location beyond a point at which the first and second inner guide surfaces engage the head and the first shaft end, respectively, to cause a residual axial tensile force in said fastener while urging the radially outward edge into a firm contact engagement with the rim, thereby radially aligning and integrally securing the first shaft end with respect to the first wall; and a means for mounting the second shaft end integrally with respect to the second wall whereby the spindle shaft spans the distance between the first and second walls and supports the at least one disk for rotation inside the housing.

2. The apparatus of claim 1 wherein:

said first and second inner guide surfaces are inclined relative to the spindle axis at respective angles about 45 degrees.

3. The apparatus of claim 1 wherein:

the first and second inner guide surfaces have substantially the same angle of incline from the spindle axis.

4. The apparatus of claim 1 wherein:

the head includes a frusto-conical head surface parallel to the first inner guide surface and engaged therewith, and the first shaft end includes a frusto-conical interface surface parallel to the second inner guide surface and engaged therewith.

5. The apparatus of claim 4 wherein:

the fastener comprises a flat head screw externally threaded along a shank thereof, and wherein the spindle shaft has an internally threaded opening extended axially into the shaft from the first shaft end, for a threaded engagement with the shank.

6. The apparatus of claim 5 wherein:

said opening is enlarged along a portion thereof adjacent the first shaft end, to leave a segment of the shank near the head free of the spindle shaft for axial elongation in response to axial tension applied to the fastener.

7. The apparatus of claim 1 wherein:

said radially outward edge of the alignment means and said rim of the first wall are cylindrical and extend in the axial direction.

8. The apparatus of claim 7 wherein:

the alignment means comprises an alignment ring in which the inner guide surfaces and radially outward edge are concentric on the spindle axis, said alignment ring including two confronting, angularly spaced apart edges defining an angular gap.

9. The apparatus of claim 1 further including:

a seal member mounted integrally to the spindle shaft axially inwardly of the first wall and having a reference surface, and a means for urging the first wall axially inward against the reference surface to axially align the first wall and spindle shaft.

10. The apparatus of claim 9 wherein:

said radially outward edge and said rim are frusto-conical and converge in the axially inward direction, and cooperate with the fastener to provide said means for urging the wall axially inward.

11. A data storage apparatus, including:

a disk drive housing having first and second opposed housing walls, an elongate spindle shaft having first and second opposite spindle shaft ends and supporting at least one data storage disk for rotation relative to the spindle about a spindle axis, and an elongate rotary actuator shaft having first and second opposite rotary shaft ends and supporting at least one data transducing head for arcuate travel about an actuator axis spaced apart from and substantially parallel to the spindle axis;

a substantially rigid but elastically deformable first spindle fastener having an elongate first shank inserted axially into the spindle shaft via the first shaft end, and a first head larger in diameter than the first shank;

a substantially rigid but elastically deformable first spindle alignment means surrounding the first spindle fastener and having: a frusto-conical first inner spindle guide surface converging in an axially inward direction toward the spindle shaft and engaged with the first head; a frusto-conical second inner spindle guide surface diverging in the axially inward direction and engaged with the first spindle shaft end; and a radially outward first edge surrounded by a first rim of the first wall;

a first actuator fastener substantially identical in construction to the first spindle fastener and inserted axially into the actuator shaft via the first actuator shaft end, and having an enlarged second head;

a first actuator alignment means surrounding the first inner actuator fastener and having: a frusto-conical first actuator guide surface converging in the axial direction toward the spindle shaft and engaged with the second head; a frusto-conical second inner actuator guide surface diverging in the axially inward direction and engaged with the first actuator shaft end; and a radially outward second edge surrounded by a second rim of the first wall;

wherein each of the first fasteners is so inserted to a predetermined axial location beyond a point at which its associated inner guide surfaces engage their associated heads and first shaft ends, respectively, to cause a residual axial tensile force in each said fastener while urging its associated radially outward edge into a firm frictional engagement with the associated rim, thereby radially aligning and integrally securing the first actuator shaft end and first spindle shaft end with respect to the first wall; and means for mounting the second spindle shaft end and second actuator shaft end integrally with respect to the second wall whereby the at least one disk and at least one transducing head are supported by their respective shafts inside of the housing.

12. The apparatus of claim 11 further including:

an axial alignment means for aligning the spindle shaft and the rotary actuator shaft axially with respect to the first wall.

13. The apparatus of claim 12 wherein:

said axial alignment means include a spindle seal member mounted integrally to the spindle shaft axially inwardly of the first wall and having a spindle reference surface, and a first urging means for urging the first wall axially inward against the spindle reference surface; an actuator alignment member integrally mounted to the actuator shaft axially inwardly of the first wall and having an actuator reference surface, and an actuator urging means for urging the first wall axially inward against the actuator reference surface, to axially align the spindle shaft and the actuator shaft with the first wall.

14. The actuator of claim 13 wherein:

said first radially outward edge and said first rim are frusto-conical and converge in the axially inward direction, and cooperate with the first spindle fastener to provide said first urging means.

15. The apparatus of claim 14 wherein:

said second radially outward edge and second rim are frusto-conical and converge in the axially inward direction, and cooperate with the first actuator fastener to provide the second urging means.

16. The apparatus of claim 11 wherein:

the spindle fastener and the actuator fastener comprise respective first and second flat head screws, each including external threads along their respective shanks and each having truncated conical heads; and wherein the spindle shaft and actuator shaft include respective first and second internally threaded openings, each opening extended axially into its associated shaft and open to its respective first shaft end, each receiving its associated shank for threaded engagement.

17. The apparatus of claim 16 wherein:

each of the first and second openings is enlarged along an outer portion thereof adjacent its associated first shaft end, to leave a portion of its associated shank near the associated head free of the associated shaft for axial elongation responsive to tension in the associated fastener.

18. The apparatus of claim 11 wherein:

said spindle alignment means and actuator alignment means respectively comprise first and second alignment rings with the associated inner guide surfaces and radially outward edges concentric on the spindle axis and actuator axis, respectively; and wherein each of the first and second rings has a pair of radially directed confronting ends, spaced apart from one another to define an angular gap in the associated ring.

19. The apparatus of claim 11 wherein:

said means for mounting the second shaft ends integrally with respect to the second wall include a second spindle fastener and a second actuator fastener, each second fastener having an elongate shank inserted axially into its associated shaft via the associated second shaft end, each second fastener further having an enlarged second head; and a second spindle alignment means and a second actuator alignment means, each second alignment means surrounding its associated second fastener and having a frusto-conical third inner guide surface converging in the axially inward direction and engaged with its associated head; a frusto-conical fourth inner guide surface diverging in the axially inward direction and engaged with its associated second shaft end; and a radially outward mounting edge surrounded by a rim of the second wall; wherein each of the second fasteners is inserted to a predetermined axial location beyond a point at which its associated third and fourth inner guide surfaces engage the associated second head and second shaft end, respectively, to cause a residual axial tensile force in each second fastener while urging the associated mounting edge into a firm frictional engagement with the associated rim of the second wall, to radially align and integrally secure the second shaft ends with respect to the second wall.

20. The apparatus of claim 19 wherein:

the first spindle alignment means, first actuator alignment means, second spindle alignment means and second actuator alignment means comprise respective first, second, third and fourth alignment rings, each alignment ring having first and second confronting radially directed edges spaced apart from one another to define an angular gap in the associated alignment ring.

21. In a disk drive including a housing and an elongate shaft integral with the housing for mounting components to rotate relative to the housing about the shaft, a means for mounting the shaft integrally with the housing; said mounting means including:

a first fastener including an elongate shank projected axially away from a first end of a shaft, and an enlarged first head at an end of the shank remote from the shaft;

a first alignment ring surrounding the fastener and having: a frusto-conical first inner guide surface converging in an axially inward direction toward the shaft and engaged with the first head; a frusto-conical second inner guide surface diverging in the axially inward direction and engaged with the first shaft end; and a radially outward first mounting edge surrounded by a first rim of a first wall of a disk drive housing;

wherein the first fastener and the first alignment ring are substantially rigid but elastically deformable;

wherein the first fastener, at least along the shank, is elastically elongated under axial tension whereby the first head and the first shaft end cooperate to radially expand the first alignment ring, thus to urge the radially outward first mounting edge into a firm frictional engagement with the first rim and thus radially align and integrally secure the first shaft end with respect to the first wall; and a means for mounting a second and opposite end of the shaft integrally to a second wall of the housing opposed to the first wall.

22. The shaft mounting means of claim 21 wherein:

the means for mounting the second shaft end includes a second fastener having an elongate second shank projected axially away from the second shaft end, and an enlarged second head at an end of the second shank remote from the shaft; a second alignment ring surrounding the second fastener and having: a frusto-conical third inner guide surface converging in the axially inward direction and engaged with the second head; a frusto-conical fourth inner guide surface diverging in the axially inward direction and engaged with the second shaft end; and a radially outward second mounting edge surrounded by a second rim of the second wall; and wherein the second shaft end and second alignment ring cooperate to maintain the second fastener in axial tension, while the second fastener and second shaft end cooperate to radially elastically expand the second alignment ring to urge the radially outward second mounting edge against the second rim to radially align and integrally secure the second shaft end with respect to the second wall.

23. The shaft mounting means of claim 22 further including:

a means for aligning the first shaft end axially with respect to the first wall.

24. The shaft mounting means of claim 23 further including:

a seal member mounted integrally to the shaft axially inwardly of the first wall and having a reference surface, and a means for urging the first wall axially inward against the reference surface to axially align the shaft with the first wall.

25. The shaft mounting means of claim 24 wherein:

said radially outward first mounting edge and said first rim are frusto-conical and converge in the axially inward direction, and cooperate with the first fastener to provide said means for urging the first wall axially inward against the reference surface.

26. The shaft mounting means of claim 25 wherein:

said radially outward second mounting edge of the second alignment ring and said second rim of the second wall are cylindrical and extend in the axial direction.

27. In a disk drive, a means for mounting a shaft integrally with a housing of the disk drive to support components for rotation relative to the housing about the shaft, including:

a disk drive housing having first and second opposed housing walls, and an elongate shaft having first and second opposite shaft ends and a first interfacing surface formed at the first shaft end;

a substantially rigid but elastically deformable fastener including an elongate shank projected axially away from the first shaft end, and an enlarged head at the end of the shank remote from the shaft, said enlarged head having a second interfacing surface;

a substantially rigid but elastically deformable alignment means surrounding the fastener, said alignment means having a first inner guide surface engaged with the first interfacing surface of the shaft, a second inner guide surface engaged with the second interfacing surface of the enlarged head, and a radially outward mounting edge;

wherein at least one of the first interfacing surface and the first inner guide surface is frusto-conical and diverges in an axially inward direction toward the spindle shaft; at least one of the second interfacing surface and the second inner guide surface is frusto-conical and converges in the axially inward direction; and the radially outward mounting edge is surrounded by a rim of said first wall;

wherein the fastener, at least along the shank, is elastically elongated under axial tension whereby the head and shaft, acting through the second interfacing surface and second inner guide surface, and through the first interfacing surface and the first inner guide surface respectively, cooperate to radially expand the alignment means, thus to urge the radially outward mounting into a firm frictional engagement with the rim, to radially align and integrally secure the first shaft end with respect to the first wall; and a means for mounting the second shaft end integrally to the second wall of the housing.

28. The shaft mounting means of claim 27 wherein:

said first inner guide surface is frusto-conical and diverges in the axially inward direction, and the second inner guide surface is frusto-conical and converges in the axially inward direction.

29. The shaft mounting means of claim 28 wherein:

said first interface surface is frusto-conical and parallel to the first guide surface, and the second interface surface is frusto-conical and parallel to the second guide surface.

30. The shaft mounting means of claim 28 wherein:

each of the first and second interface surfaces is formed with a radius.

31. The shaft mounting means of claim 27 further including:

a means for aligning the first shaft end axially with respect to the first wall.

32. The shaft mounting means of claim 27 further including:

a seal member mounted integrally to the shaft axially inwardly of the first wall and having a reference surface, and a means for urging the first wall axially inward against the reference surface to axially align the shaft with the first wall.

33. The shaft mounting means of claim 32 wherein:

said radially outward mounting edge of the alignment means and said rim of the first wall are frusto-conical and converge in the axially inward direction, and cooperate with the fastener to provide said means for urging the first wall axially inward.

34. The shaft mounting means of claim 27 wherein:

said radially outward mounting edge of the alignment means and said rim of the first wall are cylindrical and extend in the axial direction.

* * * * *